UNITED STATES PATENT OFFICE.

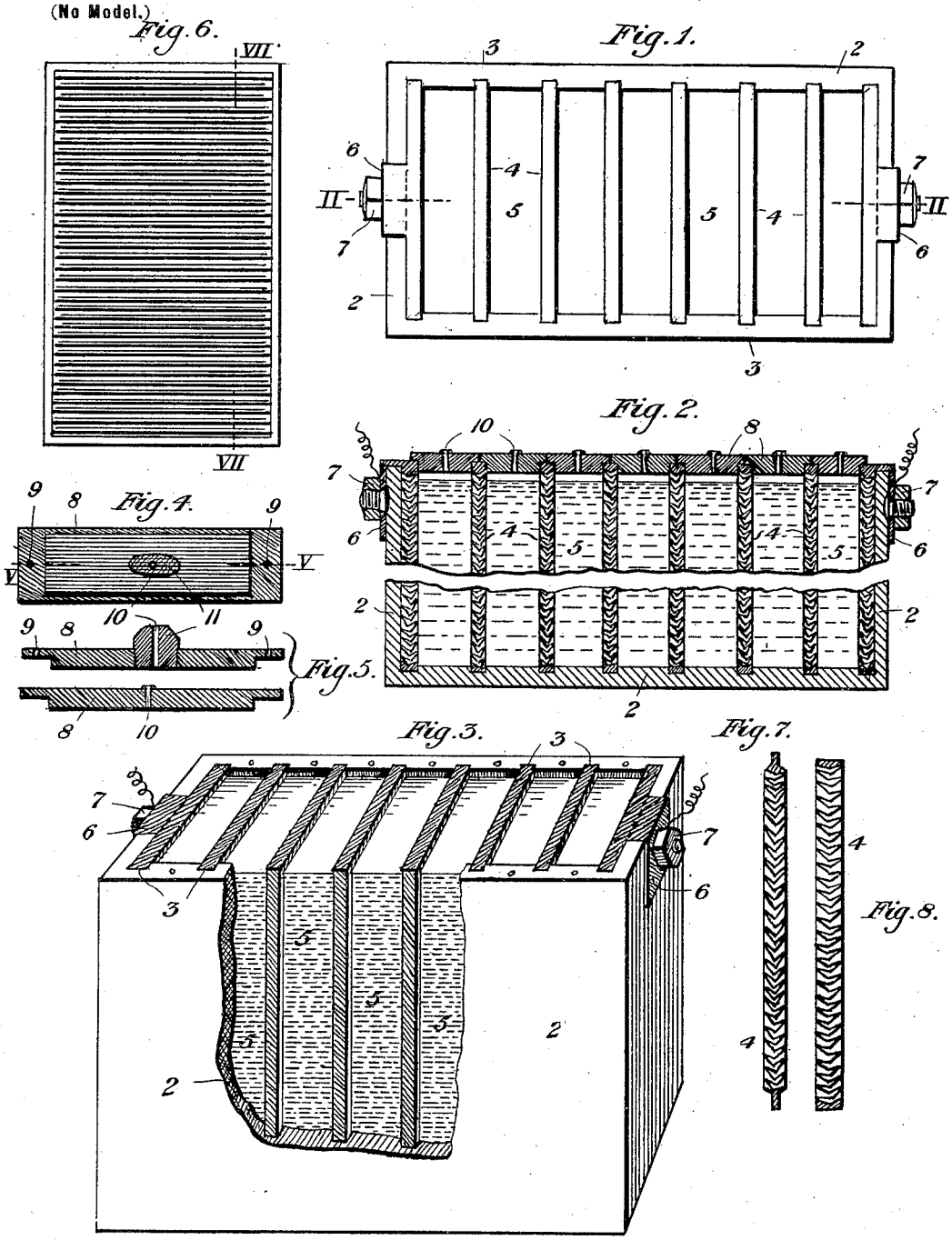

DAVID W. BEEBOUT, OF PITTSBURG, PENNSYLVANIA.

STORAGE BATTERY.

SPECIFICATION forming part of Letters Patent No. 673,792, dated May 7, 1901.

Application filed February 19, 1900. Serial No. 5,703. (No model.)

*To all whom it may concern:*

Be it known that I, DAVID W. BEEBOUT, a citizen of the United States, residing at 933 Vickroy street, Pittsburg, in the county of Allegheny and State of Pennsylvania, have invented or discovered a new and useful Improvement in Electric Storage Batteries, of which the following is a full, clear, and exact description, reference being had to the accompanying drawings, forming part of this specification, in which—

Figure 1 is a plan view of the battery with the cover-plates removed. Fig. 2 is a vertical longitudinal section, partly broken away, indicated by the line II II of Fig. 1. Fig. 3 is a perspective view of the battery, partly broken away and with the cover-plates removed. Fig. 4 is a plan view of the under side of one of the cover-plates. Fig. 5 represents in transverse section, indicated by the line V V of Fig. 4, two forms of construction of the cover-plate. Fig. 6 shows in side elevation one of the crimped lead plates. Figs. 7 and 8 are vertical sections through the plate on the line VII VII, showing the manner of forming the reinforced surrounding edge.

My invention relates to storage batteries; and it consists in the features of construction and assembling of the parts, the formation of the plates, the cover-plates, &c., as shall be more fully hereinafter described.

The objects of the invention are to simplify, lighten, and cheapen the construction of batteries of this class, to minimize the work of charging with electrolyte, and generally to produce a more compact and serviceable battery than has heretofore been made in this art.

One of the principal objects of the invention is to make an efficient battery by employing a series of plates specially constructed and treated having sides of opposite polarity, with an intervening electrolyte, through which the current is directly transmitted without the usual lateral connections or secondary plates commonly employed.

Referring now to the drawings, 2 represents the inclosing case, of properly-prepared wood or other material suitable to provide a non-conducting surrounding chamber, which case is provided on its inner side walls and bottom with regularly-spaced grooves 3, adapted to receive the plates 4, making a fluid-tight joint in the grooves and providing intervening spaces, which are filled with the electrolyte 5. The end plates fit against the inner side of the end walls of the case, and each end plate is provided with an outwardly-projecting lip 6, provided with a suitable attaching device 7 for the the terminal extremities of the current-conductor. The cover or top of the case is preferably made of individual sections 8, of non-conducting material, the middle portion of which fits down between the plates and walls, while the sides and ends of the covers project over the edges and meet centrally of the plates. These covers are secured upon the case by screws passing through holes 9 or may simply fit in neatly between the plates, with sufficient binding-friction to hold them in position, in which case the screws are dispensed with. Each plate is provided with a small central vent-hole 10 to permit of escape of gases, and in one of the forms shown in Fig. 5 and in Fig. 4 I have shown a stopper 11, of rubber or other suitable material, through which the vent-hole may be made. By removing the stopper the battery may be filled with electrolyte, or if the stopper is not used the entire cover may be removed to fill each individual cell.

The plates 4 are made of lead and are coated on opposite sides with suitable mediums of positive active matter, as red lead, and negative active matter, as litharge. It will be understood that the end plates are coated on the electrolyte side only, and they are assembled in the case in such a manner that the positive and negative sides of the adjoining plates face each other, with the electrolyte between, in which arrangement all the negative sides of the plate face toward the positive binding-post and the positive sides face toward the negative binding-post. It will be seen that as thus arranged the current is direct from end to end and that all multiplicity of individual positive and negative plates, separators, connections, &c., is avoided.

In order to secure as large an area of plate-surface as possible, the plates are preferably made of sheet-lead crimped, as shown in Figs. 6, 7, and 8, by suitable rolls, with the surrounding edges reinforced or compressed in such a manner as to provide a strong framework on all four sides and of sufficient thickness to fill the grooves of the case. This may be done by compressing the lead of the plate or by incasing the crimped plate within a separate surrounding frame, to which it may be fused or joined in some manner adapted to provide a good joint and render the interior crimped portion and the frame practically homogeneous. As thus made the plates within a given square area are capable of a comparatively very great surface exposure to the electrolyte, while giving good surface for the application of the active matter. As will be seen, the crimping operation provides a great number of laterally-extending gutters or troughs on each side by reason of the upward direction of the crimped edges, thus facilitating the holding of the electrolyte. This is of especial advantage where the battery is subject to vibration tending to dislodge the active matter, as in the case of automobiles.

The advantage of my invention will be appreciated by those skilled in the art, and it will be found in practice to give results not heretofore possible in any other construction of storage battery known to me.

Having described my invention, what I claim, and desire to secure by Letters Patent, is—

1. In a storage battery, the combination of an inclosing case of insulating material provided with receiving-grooves in the sides and bottom, a series of imperforate individual corrugated plates provided with oppositely-disposed V-shaped retaining-gutters and a reinforcing integral frame set in the grooves, insulated from each other and having their opposite surfaces covered with positive and negative active matter respectively, end plates having their inner faces only covered with active material and provided with terminal projections extending outside of the case and having terminal attaching devices, intervening electrolyte between the plates, and cover-plates for the case, substantially as set forth.

2. In a storage battery, the combination of an inclosing case of insulating material provided with receiving-grooves in the sides and bottom, a series of imperforate individual corrugated plates provided with oppositely-disposed V-shaped retaining-gutters and a reinforcing integral frame set in the grooves, insulated from each other and having their opposite surfaces covered with positive and negative active matter respectively, end plates having their inner faces only covered with active material and provided with terminal projections extending outside of the case and having terminal attaching devices, intervening electrolyte between the plates, and cover-plates for the case provided with vent-holes, substantially as set forth.

3. In a storage battery, the combination of an inclosing case of insulating material provided with receiving-grooves in the sides and bottom, a series of imperforate individual corrugated plates provided with oppositely-disposed V-shaped retaining-gutters and a reinforcing integral frame set in the grooves, insulated from each other and having their opposite surfaces covered with positive and negative active matter respectively, end plates having their inner faces only covered with active material and provided with terminal projections extending outside of the case and having terminal attaching devices, intervening electrolyte between the plates, and cover-plates for the case provided with removable plugs of insulating material having perforating vent-holes, substantially as set forth.

In testimony whereof I have hereunto set my hand.

DAVID W. BEEBOUT.

In presence of—
PETER J. EDWARDS,
C. M. CLARKE.